(12) United States Patent
McHenry

(10) Patent No.: US 12,051,525 B2
(45) Date of Patent: Jul. 30, 2024

(54) APPARATUS AND METHODS OF PREVENTING POWER OUTAGES

(71) Applicant: MW Holdings Group, LLC, Fairfield, AL (US)

(72) Inventor: Larry McHenry, Fairfield, AL (US)

(73) Assignee: Power Grid Professionals Inc, Fairfield, AL (US)

( * ) Notice: Subject to any disclaimer, the term of this patent is extended or adjusted under 35 U.S.C. 154(b) by 0 days.

(21) Appl. No.: 17/933,997

(22) Filed: Sep. 21, 2022

(65) Prior Publication Data

US 2023/0090430 A1 Mar. 23, 2023

Related U.S. Application Data

(60) Provisional application No. 63/374,747, filed on Sep. 6, 2022, provisional application No. 63/271,210, filed on Oct. 24, 2021, provisional application No. 63/246,783, filed on Sep. 21, 2021.

(51) Int. Cl.
*H01B 17/56* (2006.01)
*H02G 3/22* (2006.01)

(52) U.S. Cl.
CPC ............. *H01B 17/56* (2013.01); *H02G 3/22* (2013.01)

(58) Field of Classification Search
CPC ......... H01F 27/02; H01F 27/04; H01B 17/56; H01B 17/38; H01B 17/62; H02G 7/00
See application file for complete search history.

(56) References Cited

U.S. PATENT DOCUMENTS

| 3,305,209 A | 5/1962 | Smith, Jr. |
| 3,305,812 A | 2/1967 | Macchia et al. |
| 4,906,801 A * | 3/1990 | Beasley ................. H01F 27/02 336/105 |
| 5,682,015 A | 10/1997 | Harben |
| 6,683,249 B1 | 1/2004 | Leppin |
| 2012/0007707 A1 | 1/2012 | Matai et al. |
| 2013/0292170 A1 * | 11/2013 | Kaddas .................... E04B 1/72 29/592.1 |

FOREIGN PATENT DOCUMENTS

JP 06267752 A * 9/1994

OTHER PUBLICATIONS

Alberti, Michele, International Search Report and Written Opinion in PCT/IB2022/058944 (corresponding application), European Patent Office, Jan. 24, 2023 (Mail Date), 17 pages, Netherlands.

* cited by examiner

*Primary Examiner* — Livius R. Cazan
(74) *Attorney, Agent, or Firm* — Silver Legal LLC; Jarrett L. Silver

(57) ABSTRACT

An apparatus configured to prevent electrical outages is provided herein. Methods of coating a transformer in an insulator coating are also provided herein. In various exemplary embodiments, the apparatus comprises an insulator configured to prevent an electrically charged animal or debris from contacting a grounded surface of a transformer.

31 Claims, 18 Drawing Sheets

APPARATUS AND METHODS OF PREVENTING POWER OUTAGES

CROSS REFERENCE TO RELATED APPLICATIONS

This application claims the benefit of and priority to U.S. Provisional Patent Application No. 63/374,747 filed on Sep. 6, 2022, U.S. Provisional Patent Application No. 63/271,210 filed on Oct. 24, 2021, and U.S. Provisional Patent Application No. 63/246,783 filed on Sep. 21, 2021. These applications are incorporated by reference in their entirety.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present inventive concept relates to the field of power-outage prevention. More particularly, the invention relates to prevention of wildlife- and weather-induced power outages.

Technology in the Field of the Invention

A common problem with electric utility companies are outages that occur when a foreign object or animal contacts an energized power line, bushing, or other component of an electrical system and becomes grounded such as through contact with the top of a transformer. After becoming grounded, the energized foreign object or animal causes a short circuit, which ultimately results in a power outage than can affect multiple households and business. These outages are associated with substantial economic costs due to temporary loss of electricity to end users, labor costs to locate, diagnose, and repair the outage, and legal costs associated with suit from dissatisfied customers.

In addition, to the economic costs, such outages induced by animals result in electrocution and subsequent death of the affected animal.

Current solutions fail at adequately addressing the problems. For instance, covering of the bushing is ineffective in prevention of larger animals such as cats, raccoons, opossums, or bears. Each of these animals are proficient climbers and are large enough to reach from the top of a transformer to wiring. As soon as such an animal contacts the wiring and becomes energized, the animal causes a short circuit and a subsequent power outage.

Alternate solutions fail to protect against the weather and are prone to damage and loss of electrical resistance when wet. In addition, current solutions can be easily dislodged form their intended location resulting in frequent failure of the protective device and an ineffective solution to power outages. Current designs to remedy wildlife and weather-related outages are also ill-equipped to withstand long-term use, and often become brittle or damaged overtime, requiring frequent replacement and maintenance.

Finally, current solutions are difficult or very dangerous to install on existing power grids, requiring the grids to be temporarily shut down during installation, which, again creates consumer dissatisfaction and lost revenue. Further, installation of current solutions can be timely, which increases labor costs. Therefore, current insulators or wildlife deterrents, do not represent viable, economic options for remedying ongoing issues with outages caused by short circuits through foreign objects or animals.

As such, there is a strong need for an apparatus that can effectively prevent outages from animals or debris of any size that is both weather-resistant and durable and can be easily and quickly installed without requiring the power to be disconnect from the installation point.

SUMMARY

Disclosed herein is an apparatus for preventing power outages. In various embodiments, the apparatus comprises an insulator, wherein the insulator comprises a non-conductive material, and the insulator is configured to completely cover a top surface of a transformer. The insulator can be configured to prevent an electrically charged animal or debris from contacting a grounded surface of the transformer.

In embodiments, the animal comprises a mammal, reptile, bird, or a combination thereof. The debris can include a foreign object or rubble resulting from accidental contact by a human, a natural disaster, a terrorist attack, criminal acts, or a combination thereof. In certain embodiments, the mammal comprises a primate, a rodent, a raccoon, a feline, a bear, a marsupial, or a combination thereof. The bird can comprise an owl, a raptor, waterfowl, a dove, a pigeon, a parrot, a parakeet, a cockatoo, a pelican, a seagull, a hawk, an eagle, a falcon, a vulture, a perching bird, or a combination thereof. In one embodiment, the reptile comprises a snake, a lizard, or a combination thereof. In certain embodiments, the primate comprises a human, monkey, a chimpanzee, a gorilla, an orangutan, or a combination thereof. The rodent can comprise a squirrel, a mouse, a rat, or a combination thereof. The feline can comprise a house cat, a wild cat, or a combination thereof. In one embodiment, the marsupial comprises an opossum.

In various embodiments, the apparatus further comprises a connector assembly and a means for reversibly securing the insulator to the transformer. The means for reversibly securing the insulator to the transformer can comprise a latch, a buckle, a clamp, a clasp, a side release buckle, a carabiner, a snap-fit, a friction fit, a hook and loop connector (e.g., Velcro brand connectors), a button and eye, a cam lock, a post and keyhole, a press-fitting, a thread locking, a snap, a spring-loaded pins, or a combination thereof.

In embodiments, the non-conductive material comprises paper, glass, fiberglass, fabric, rubber, porcelain, ceramic, plastic, wood, quartz, diamond, or a combination thereof.

The insulator can comprise a sidewall configured to extend down a portion of at least one side of the transformer. In embodiments, the insulator is configured to rest gravitationally upon the top surface of the transformer.

In certain embodiments, the apparatus includes an enclosure configured to surround at least one bushing. The enclosure can be configured to gravitationally rest upon the insulator, configured to be reversibly attached to the insulator, or can be integral with the insulator.

In various embodiments, the insulator includes least one bushing port comprising a hole, gap, notch, channel, or combination thereof extending therethrough, wherein the bushing port comprises a configuration that is complimentary to that of at least one bushing, and is configured to permit the least one bushing to extend through the insulator.

The at least one bushing port can comprise a customizable size, a customizable shape, or a combination thereof. In such embodiments, the insulator can comprise a means for selecting the customizable size, customizable shape, or a combination thereof, wherein the customizable size and the customizable shape are complimentary to that of the bushing such that the bushing is able to extend through the insulator. In embodiments, the means for selecting comprises a perforation, wherein the perforation forms a perimeter around the customizable size and customizable shape; a threadable portion configured to reversibly secure the customizable size and customizable shape thereto, wherein the customizable size and customizable shape comprise threads that are complementary to that of the threadable portion; or a combination thereof. In embodiments, the apparatus comprises up to twenty bushing ports.

In certain embodiments, the apparatus of claim 1, wherein the insulator comprises a shape, size, and configuration that is molded to fit any commercially available transformer. The insulator can comprise a thickness between about 1/32 of an inch up to about 1/2 of an inch. In embodiments, the insulator comprises a thickness of between about 1/16 of an inch to about 1/4 of an inch. The insulator can comprise a thickness of about 1/8 of an inch.

The insulator can comprise a surface area that is sufficient to cover the top surface of a transformer comprising a kilovolt (KV) rating of about 1 KV or more. In embodiments, the insulator comprises a surface area that is sufficient to cover the top surface of a transformer comprising a rating of up to about 1,000 KV. The insulator can comprise a surface area that is sufficient to cover the top surface of a transformer comprising a rating of any one or more of the following: about 1 KV, about 5 KV, about 10 KV, about 15 KV, about 25 KV, about 37.5 KV, about 50 KV, about 75 KV, and about 100 KV. In certain embodiments, the insulator comprises a diameter or length of between about 1 inch and about 1,000 inches.

In another aspect, the invention provides a method of applying an insulator coating to a transformer. In embodiments, the method comprises pumping a fluid insulator coating to a coating apparatus such that the fluid insulator coating flows therethrough; passing at least one surface of a transformer under or through the coating apparatus such that the fluid insulator coating is applied to the at least one surface of the transformer; and permitting the insulator coating to dry on the at least one surface of the transformer. In one embodiment, the method comprises the step of passing the at least one surface of the transformer under or through the coating apparatus is repeated at least one time, at least two times, at least three times, at least four times, at least five times, at least six times, at least seven times, at least eight times, at least nine times, or at least ten times. In one embodiment, the step of passing the at least one surface of the transformer under or through the coating apparatus is repeated a sufficient number of times until the insulator coating comprises a thickness of between about 1/32 of an inch up to about 1/4 of an inch. In certain embodiments, the insulator coating comprises a uniform consistency and thickness across the surface of the transformer.

BRIEF DESCRIPTION OF THE DRAWINGS

So that the manner in which the present inventions can be better understood, certain illustrations, photographs, charts and/or flow charts are appended hereto. It is to be noted, however, that the drawings illustrate only select embodiments of the inventions and are therefore not to be considered limiting of scope, for the inventions may admit to other equally effective embodiments and applications. Reference numerals are optionally repeated to emphasize various features, but Their absence should not be interpreted to mean the absence of a feature. Additionally, the same reference numeral may be used across embodiments for similar features even if such features are not identical.

Figure 4A:
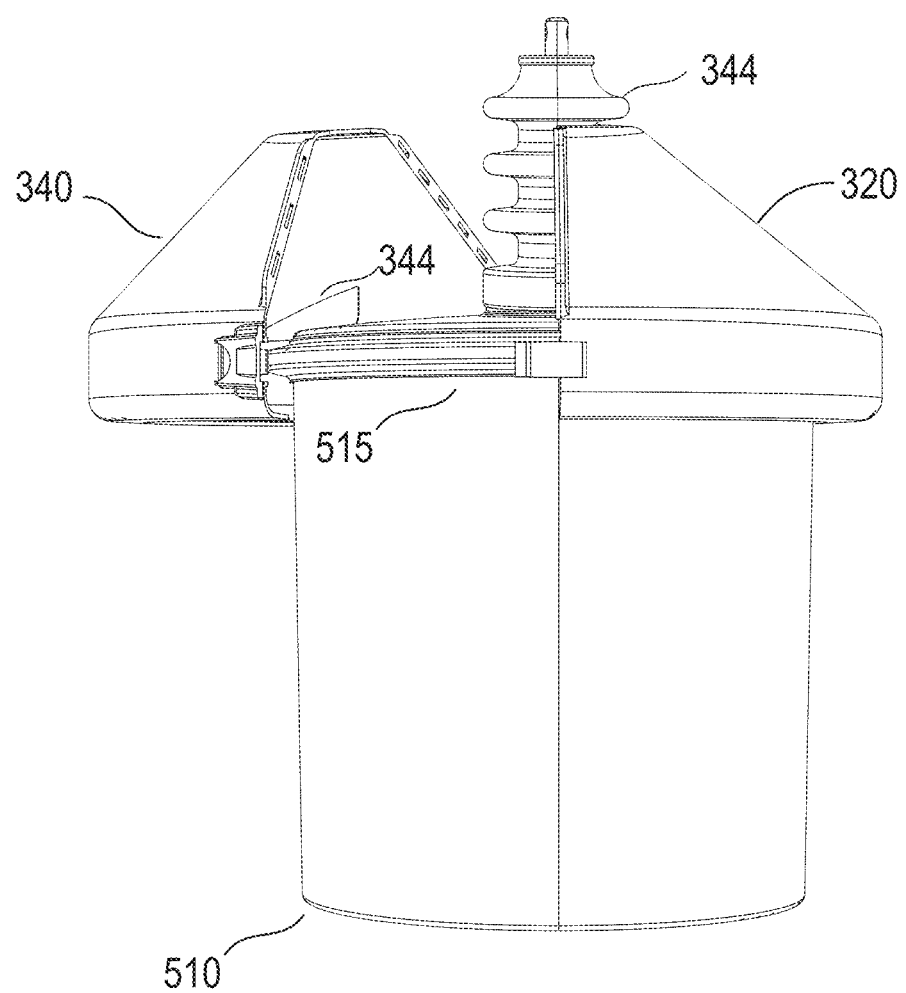
FIG. 4A depicts a front view of another example embodiment of an insulator on a transformer.
Figure 4B:
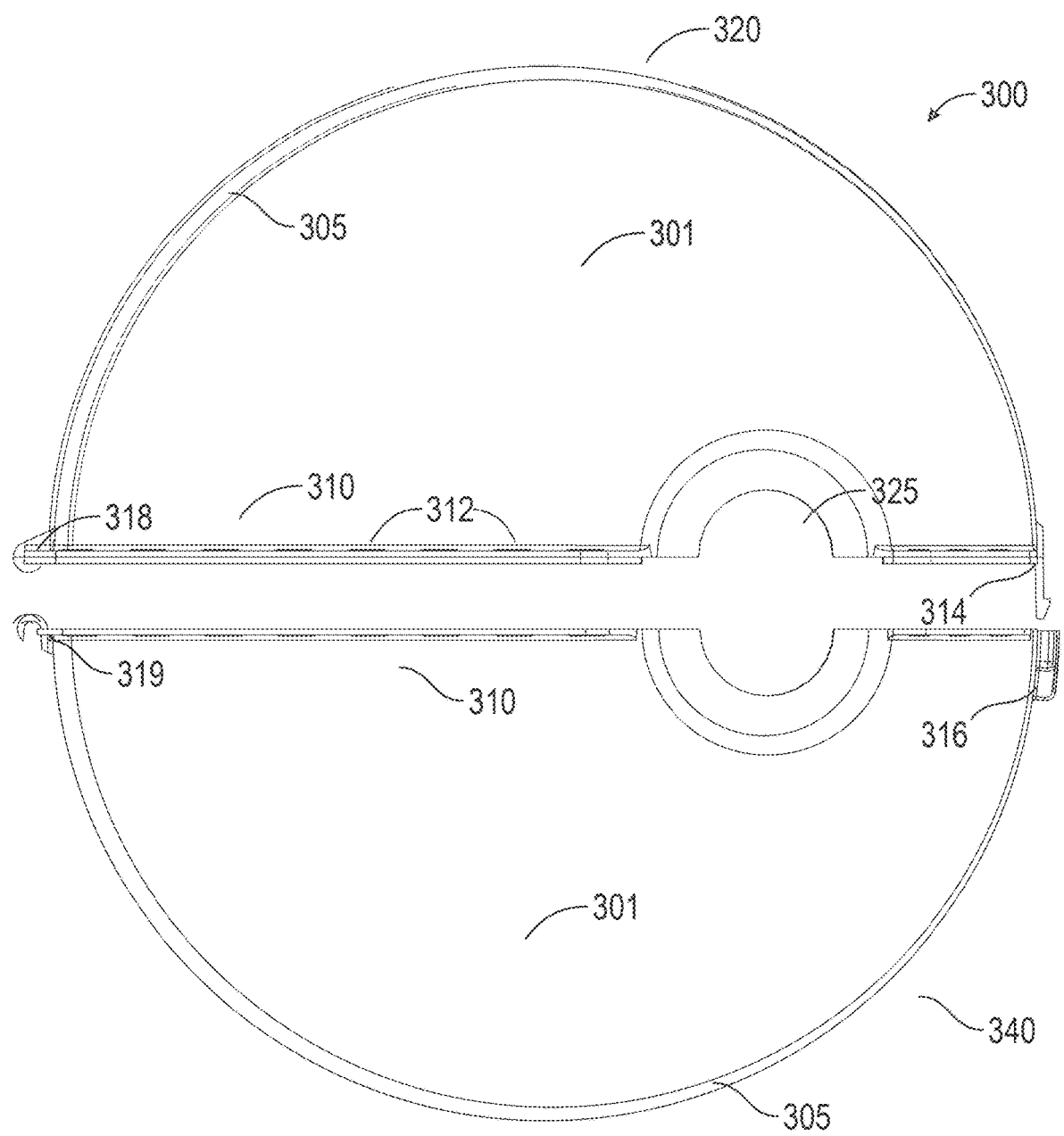
FIGS. 4B and 4C respectively depicts top and bottom views of a left and right part of the embodiment of FIG. 4A.
Figure 4C:
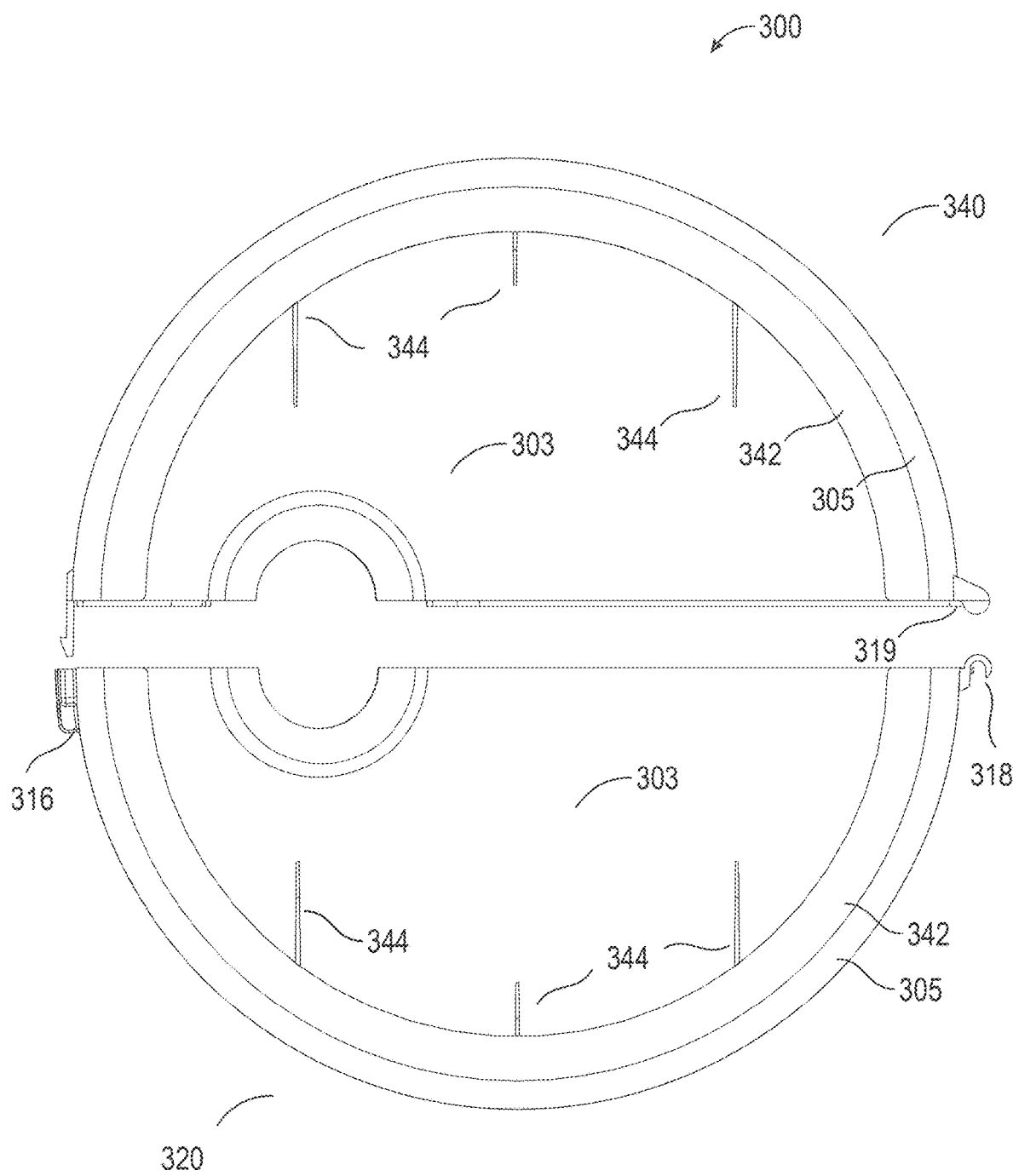
Figure 4D:
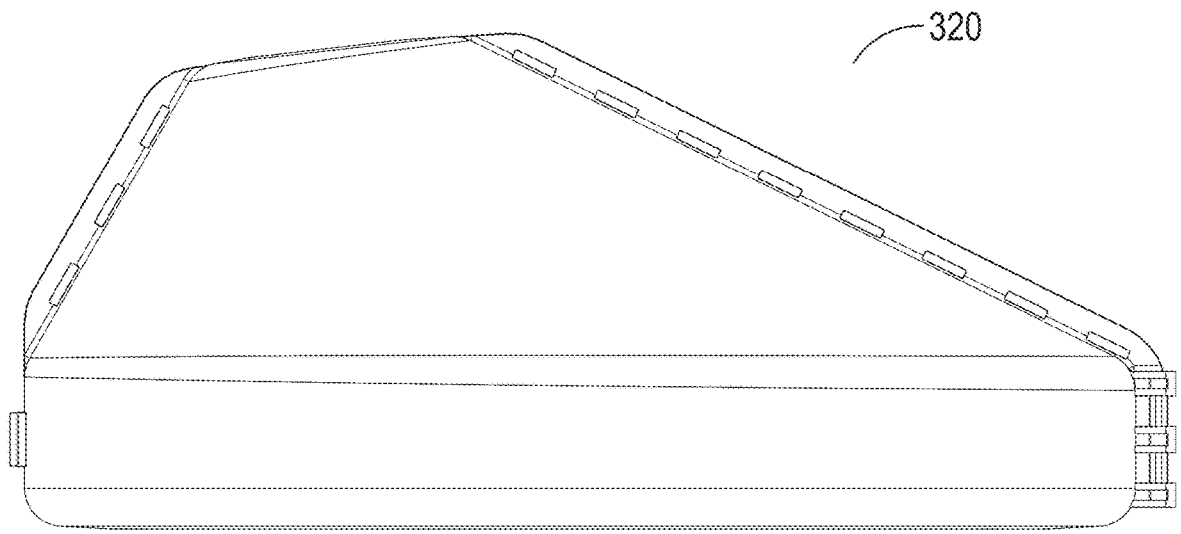
FIGS. 4D and 4G respectively depict outer and interviews of the left part of the embodiment of FIG. 4A.
Figure 4E:
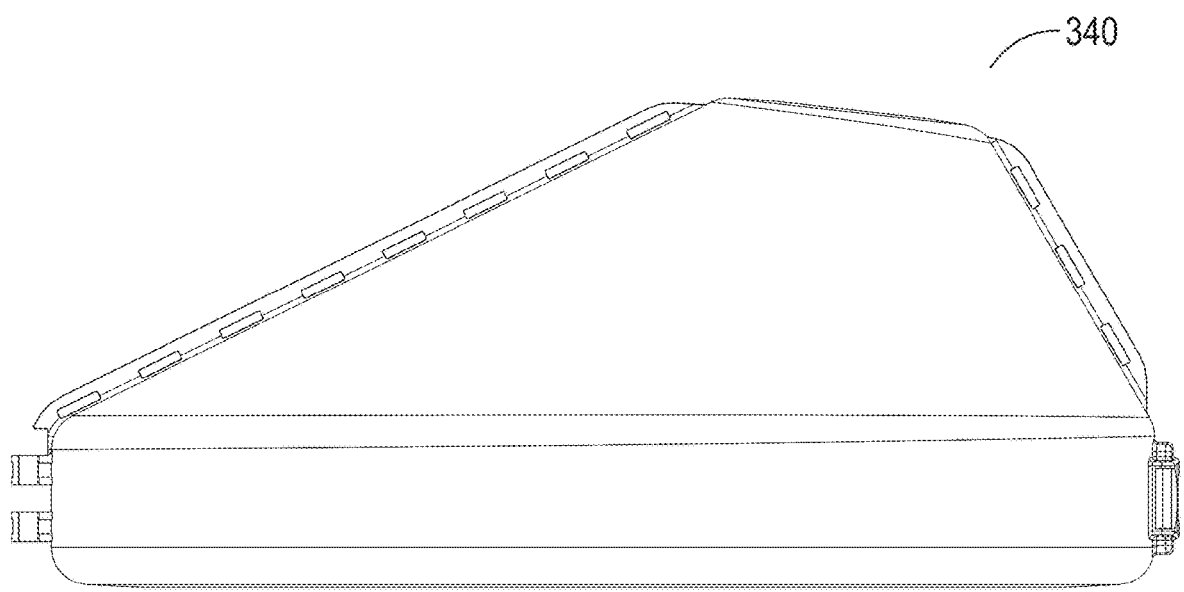
Figure 4F:
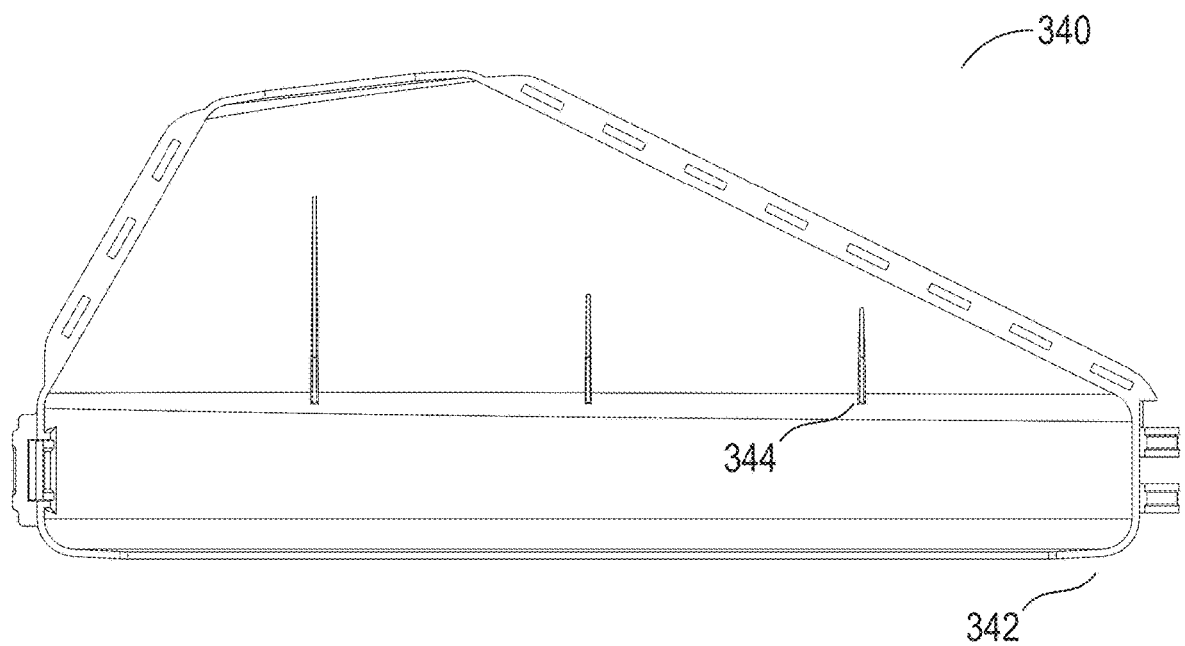
Figure 4G:
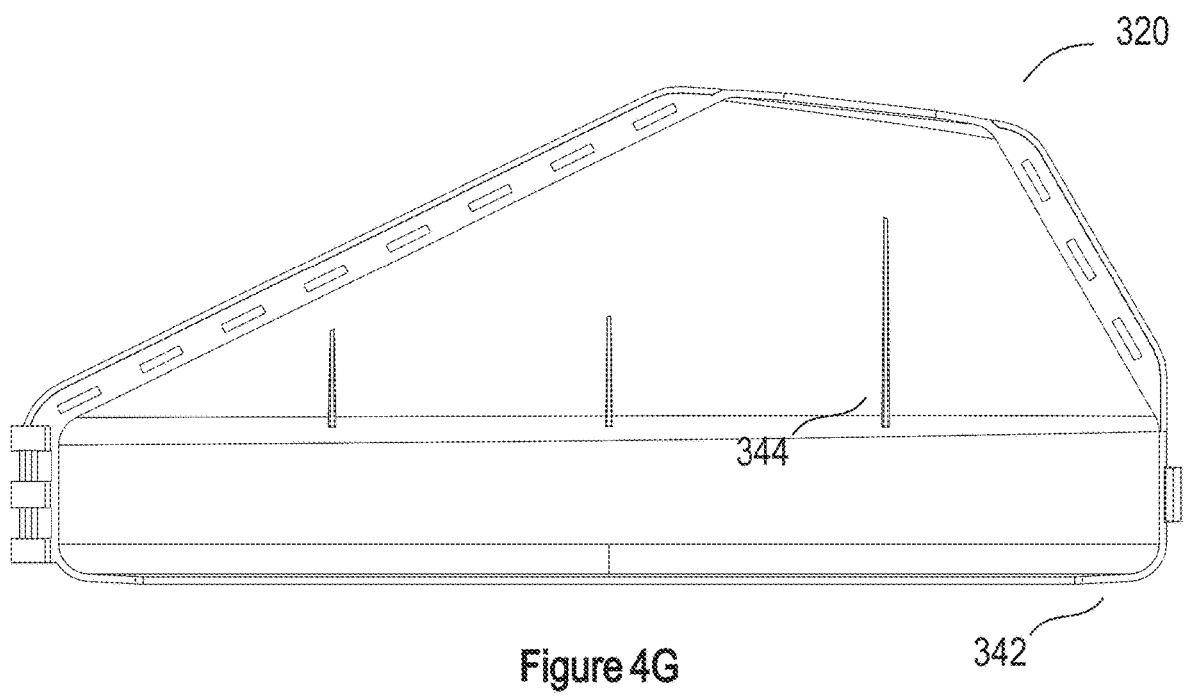

Figures for E and 4F respectively depict outer and inner views of the right part of the embodiment of FIG. 4A.

Figure 4H:
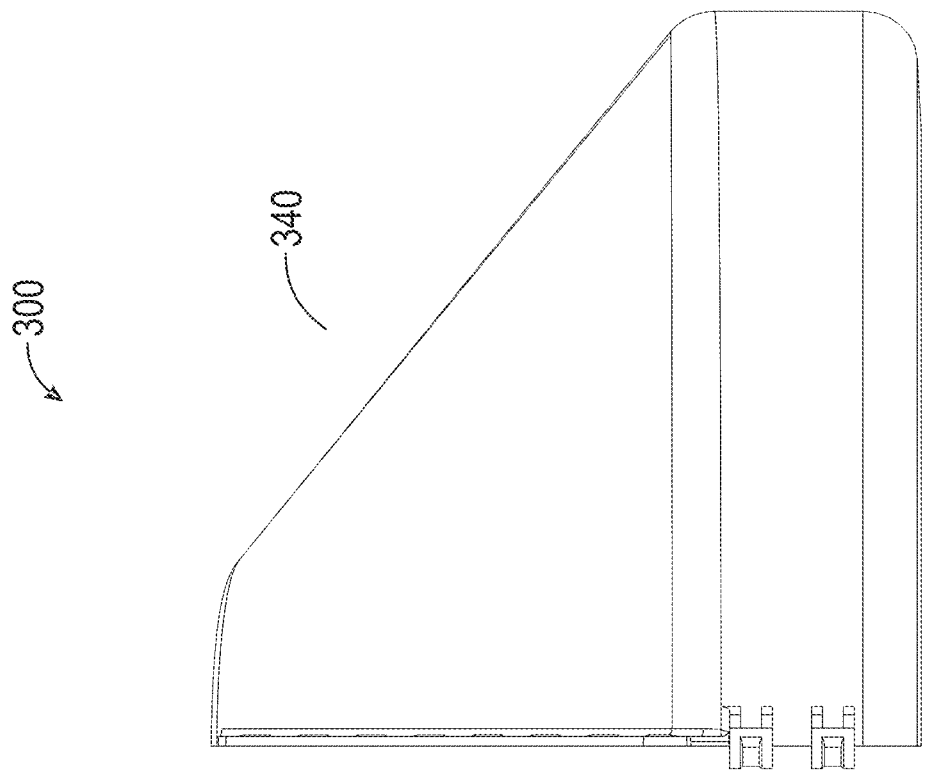
Figure 4H:
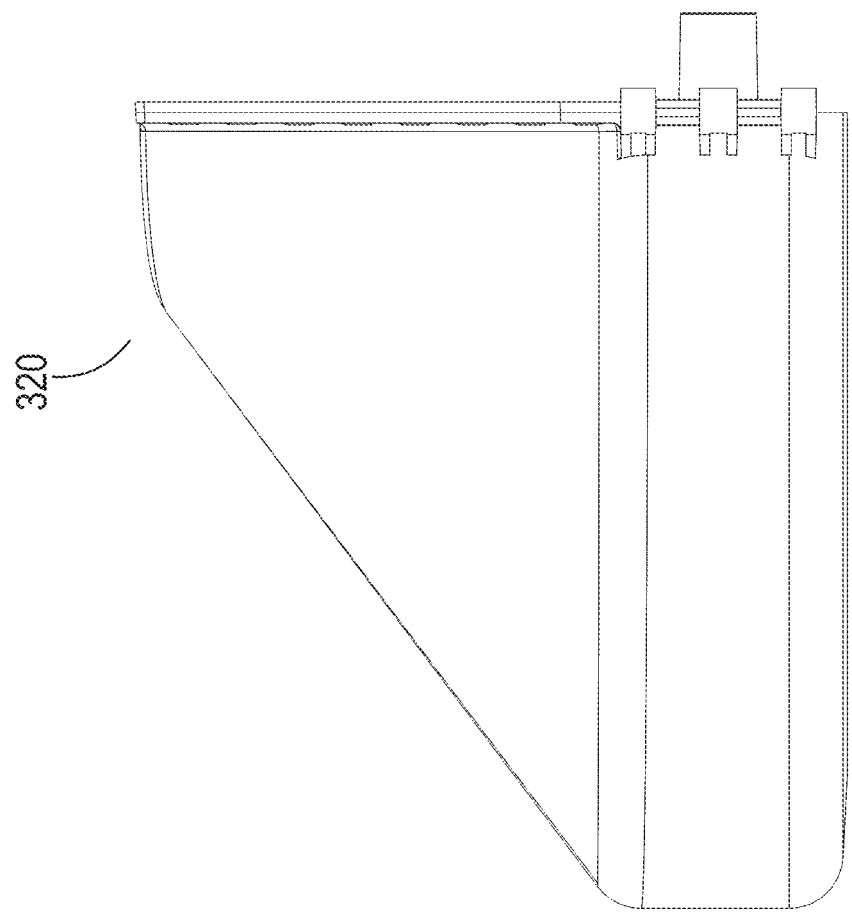
Figure 4I:
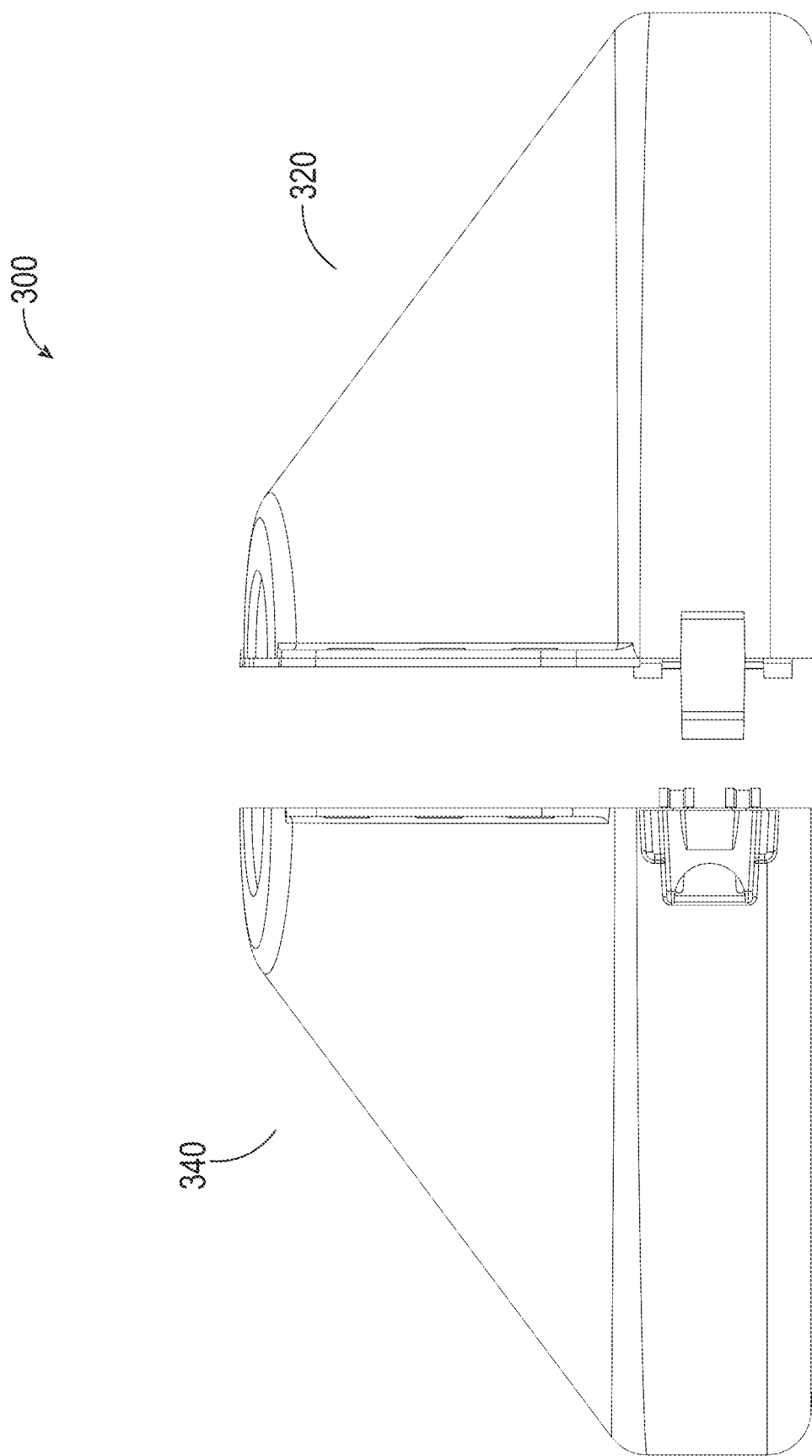

FIGS. 4H and 4I respectively depict rear and front views of the left part and the right part of the embodiment of FIG. 4A.

Figure 4J:
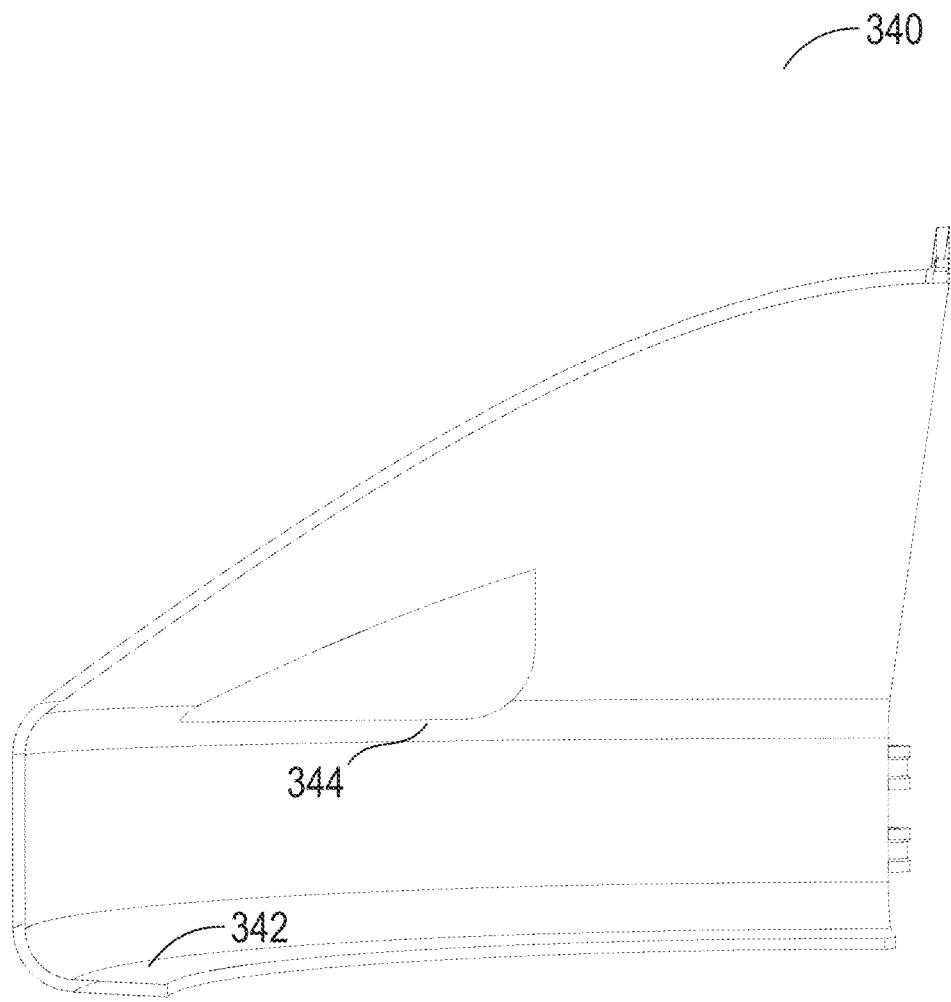

FIG. 4J is a cutaway view towards the rear of the left part of the embodiment of FIG. 4A.

Figure 5:
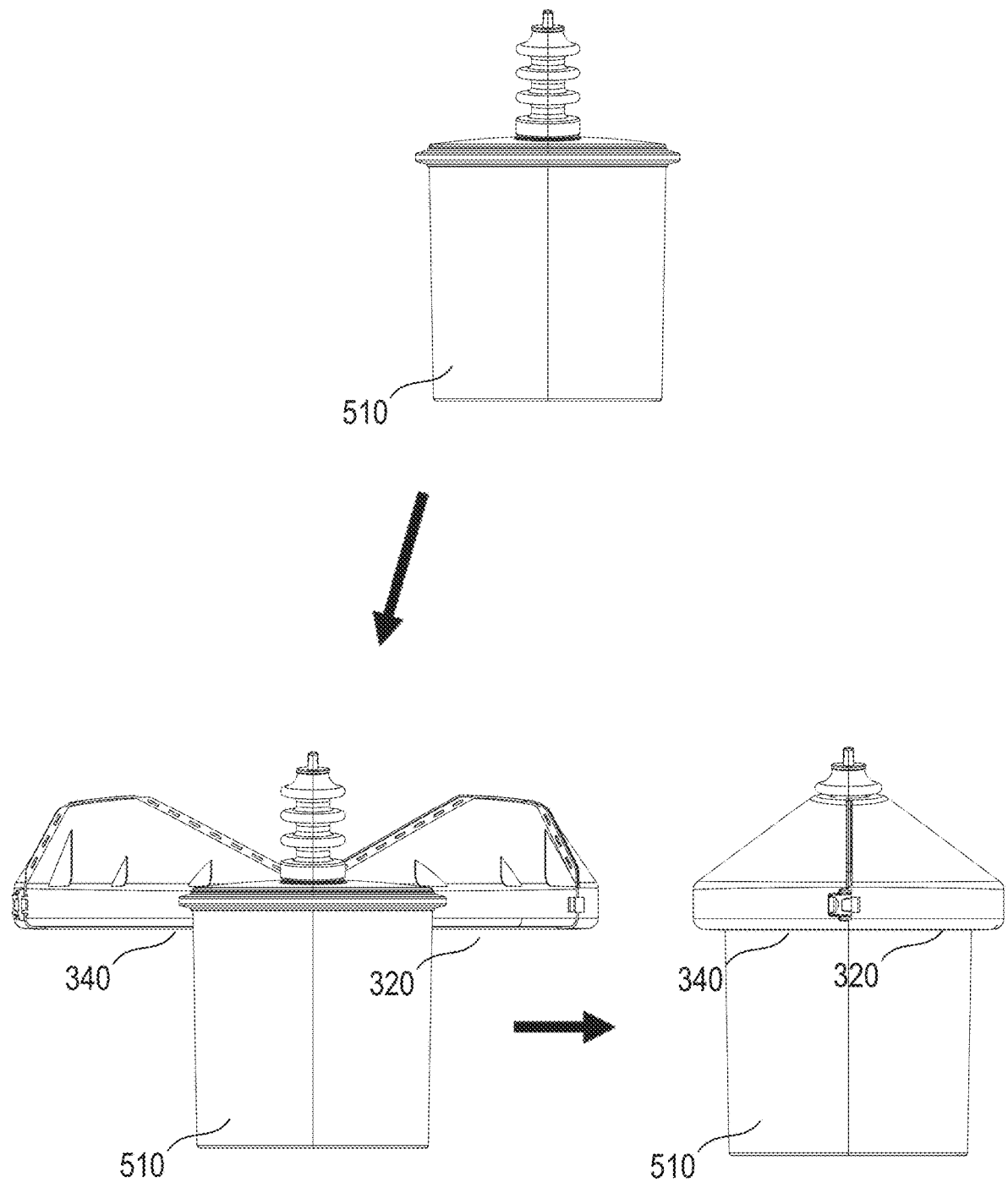

FIG. 5 shows like example method steps of installing the insulator up FIG. 4A.

Figure 6A:
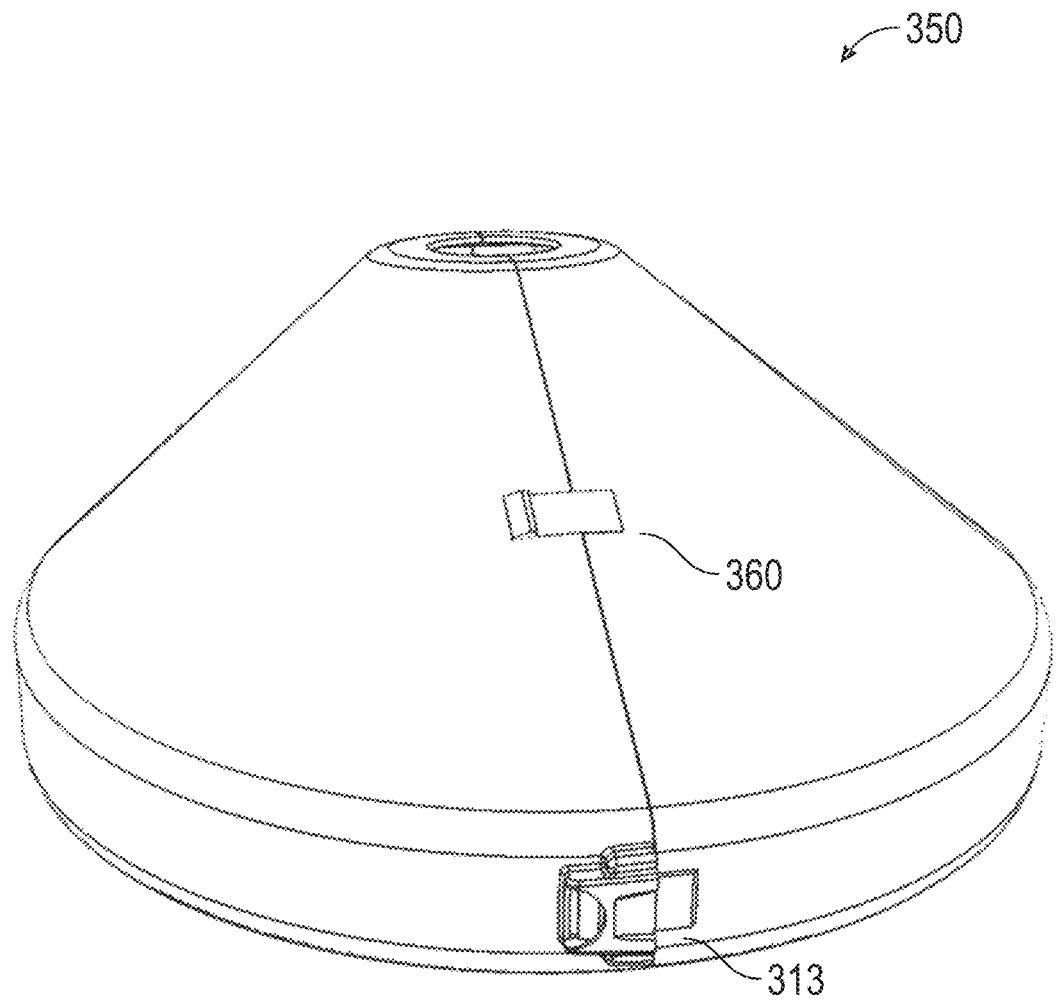
Figure 6B:
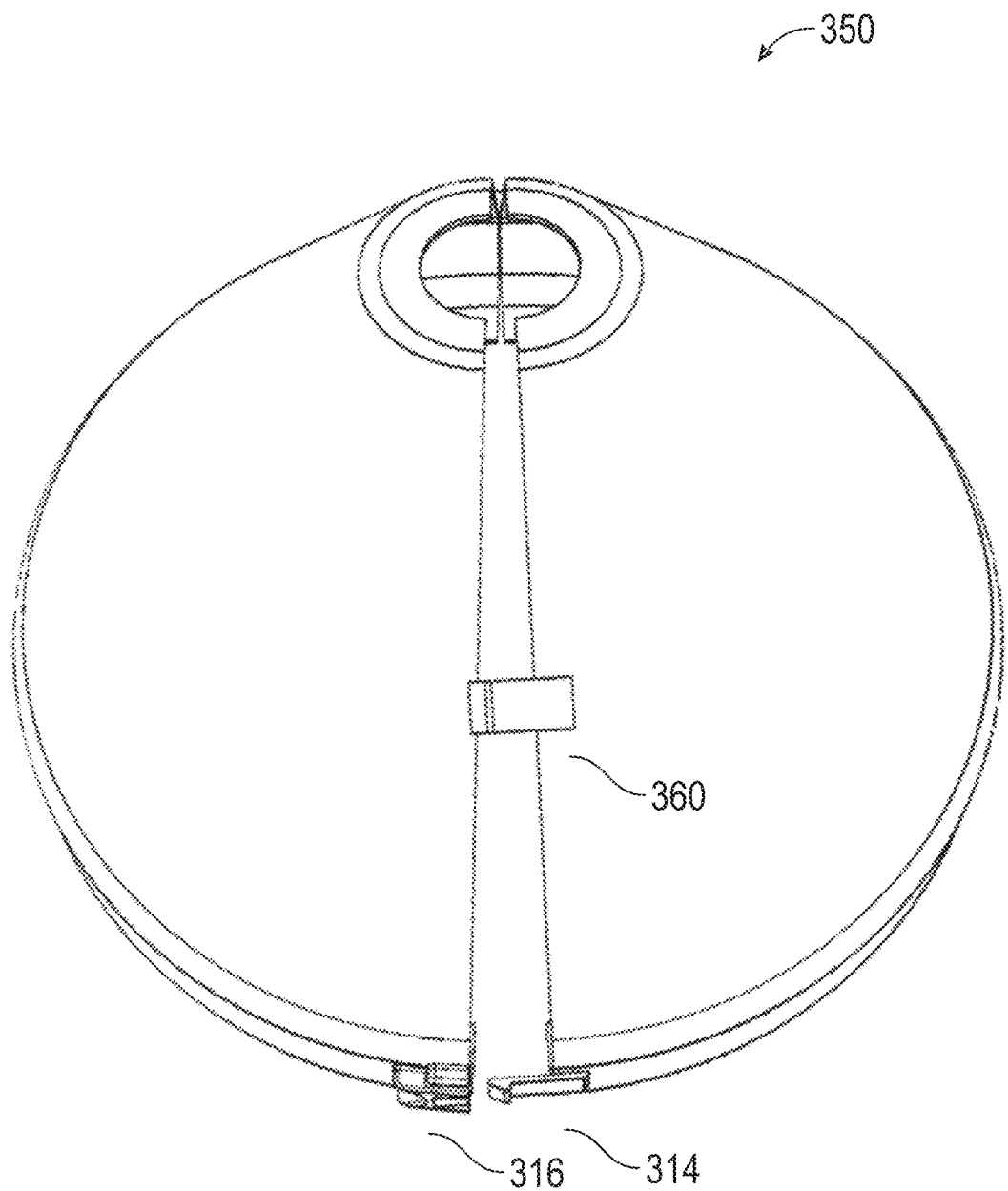

FIGS. 6A and 6B respectively show assembled and open configurations of another example embodiment of an insulator.

Figure 7A:
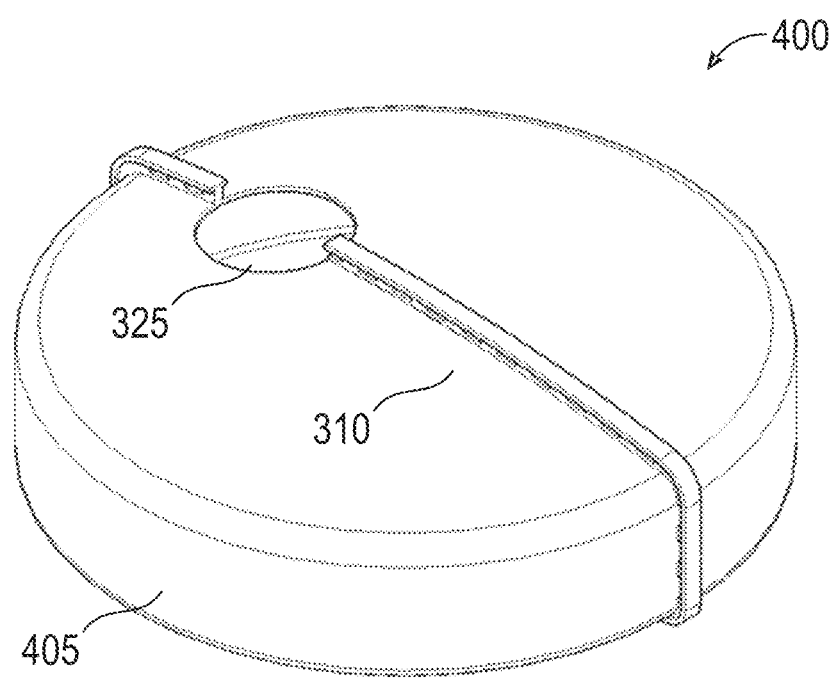

FIG. 7A shows a perspective view of another example embodiment with a flat upper surface in an assembled configuration.

Figure 7B:
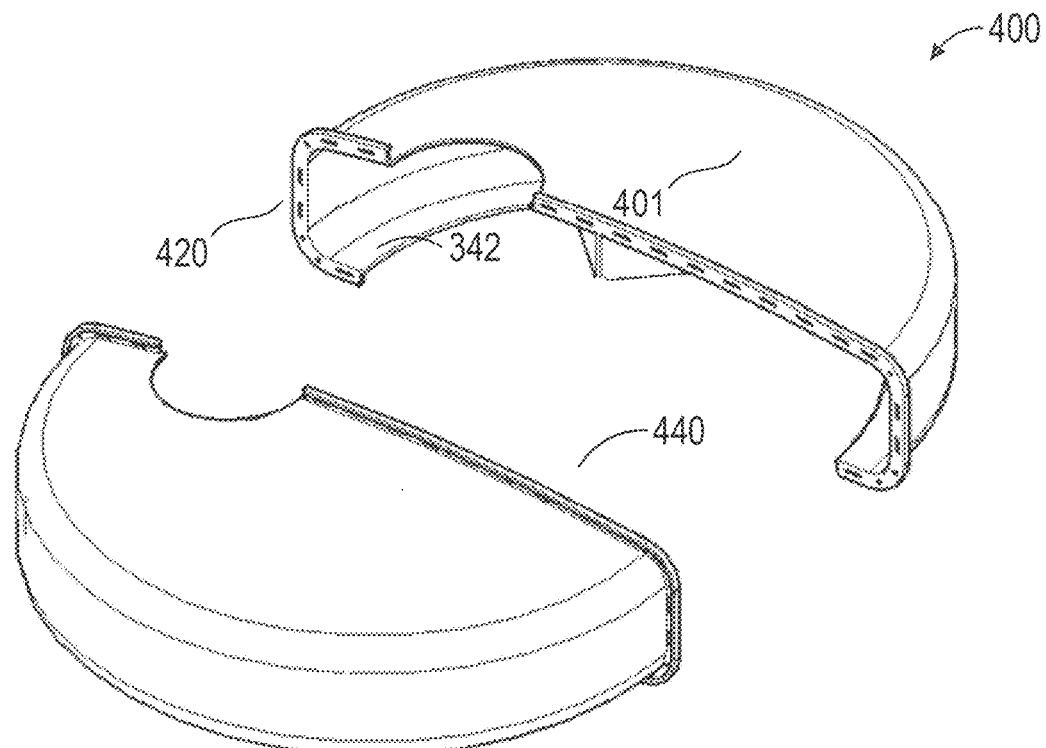
Figure 7C:
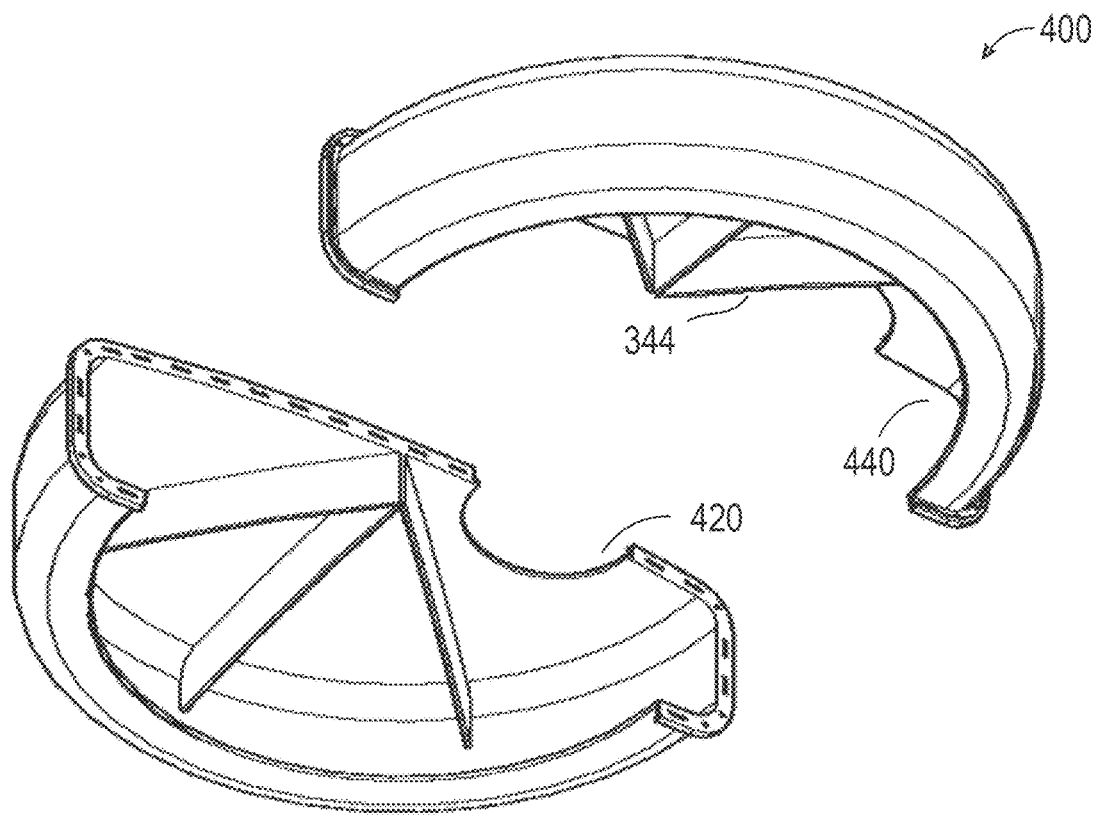

FIGS. 7B and 7C respectively depict upper perspective and lower perspective exploded views of the embodiment in FIG. 7A.

Figure 8:
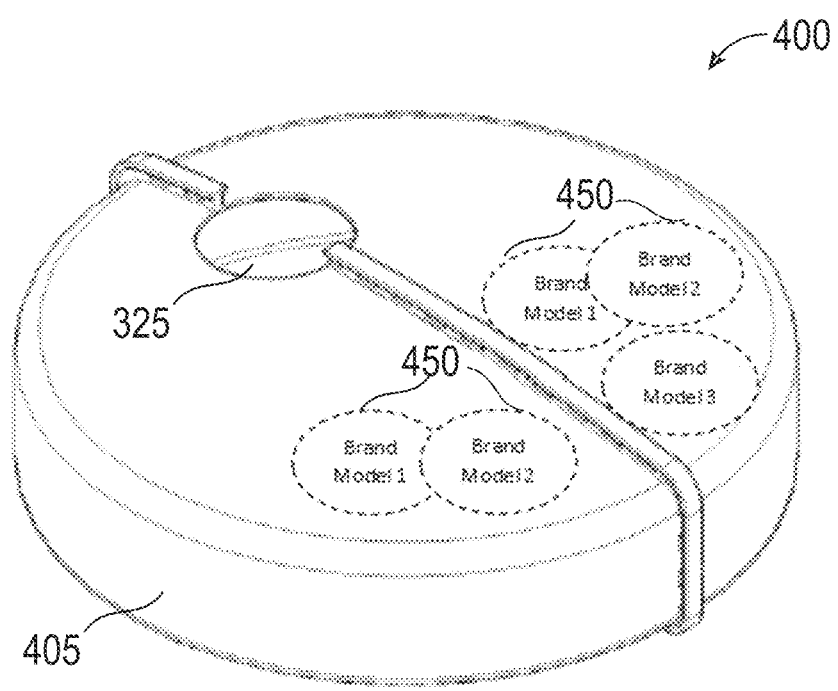

FIG. 8 depicts a template for material removal on the embodiment of FIG. 7A.

DETAILED DESCRIPTION OF CERTAIN

Embodiments

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate manner.

Definitions

The singular forms "a," "an," and "the" include plural reference unless the context clearly dictates otherwise. The use of the word "a" or "an" when used in conjunction with the term "comprising" in the claims and/or the specification may mean "one," but it is also consistent with the meaning of "one or more," "at least one," and "one or more than one."

Wherever any of the phrases "for example," "such as," "including" and the like are used herein, the phrase "and without limitation" is understood to follow unless explicitly stated otherwise. Similarly "an example," "exemplary" and the like are understood to be non-limiting.

The term "substantially" allows for deviations from the descriptor that do not negatively impact the intended purpose. Descriptive terms are understood to be modified by the term "substantially" even if the word "substantially" is not explicitly recited. Therefore, for example, the phrase "wherein the lever extends vertically" means "wherein the lever extends substantially vertically" so long as a precise vertical arrangement is not necessary for the lever to perform its function.

The terms "comprising" and "including" and "having" and "involving" (and similarly "comprises," "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a process involving steps a, b, and c" means that the process includes at least steps a, b and c. Wherever the terms "a" or "an" are used, "one or more" is understood, unless such interpretation is nonsensical in context.

As used herein the term "about" is used to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As used herein, the word "transformer" can mean any commercially available or custom-produced transformer. For example, a transformer can comprise a step-up transformer, step-down transformer, a power transformer, a distribution transformer, an instrument transformer comprising current and potential transformer, a single-phase transformer, a three-phase transformer, an auto transformer, or any combination thereof. Transformers can include those useful for overhead electrical transmissions systems, underground electrical transmission systems, or a combination thereof.

As used herein, there phrase "non-conductive material" can refer to materials that block or reduce the flow of electrons from one surface to another. Non-limiting examples of non-conductive materials comprise rubber, plastic, paper, glass, porcelain, ceramic, or any other material that is presently known or hereinafter developed that is efficient in preventing the flow of electrons.

As used herein the term "animal" can refer to any living organism that is sufficiently large to short circuit an electricity delivery system. An "animal" can include a mammal, a reptile, a bird, or a combination thereof.

As used herein the term "debris" can include any inanimate foreign object that is sufficiently large to short circuit an electricity delivery system. Examples of debris include kites, drones, toy helicopters, balls, balloons, or other objects that may accidentally come into contact with a transformer. In addition, "debris" includes any objects that were deliberately intended to disrupt power supply such as through criminal or terrorist attacks. "Debris" can further include rubble that may contact powerlines during or immediately following a natural disaster such as a hurricane, tornado, or other acts of god. "Fit snugly" means an opening that is closely matched to another feature so that debris cannot enter between the opening and the feature.

Description of Selected Specific Embodiments

An apparatus configured to prevent electrical outages is provided herein. In various exemplary embodiments, the apparatus comprises an insulator configured to prevent an electrically charged animal or debris from contacting a grounded surface of a transformer.

Figure 1:
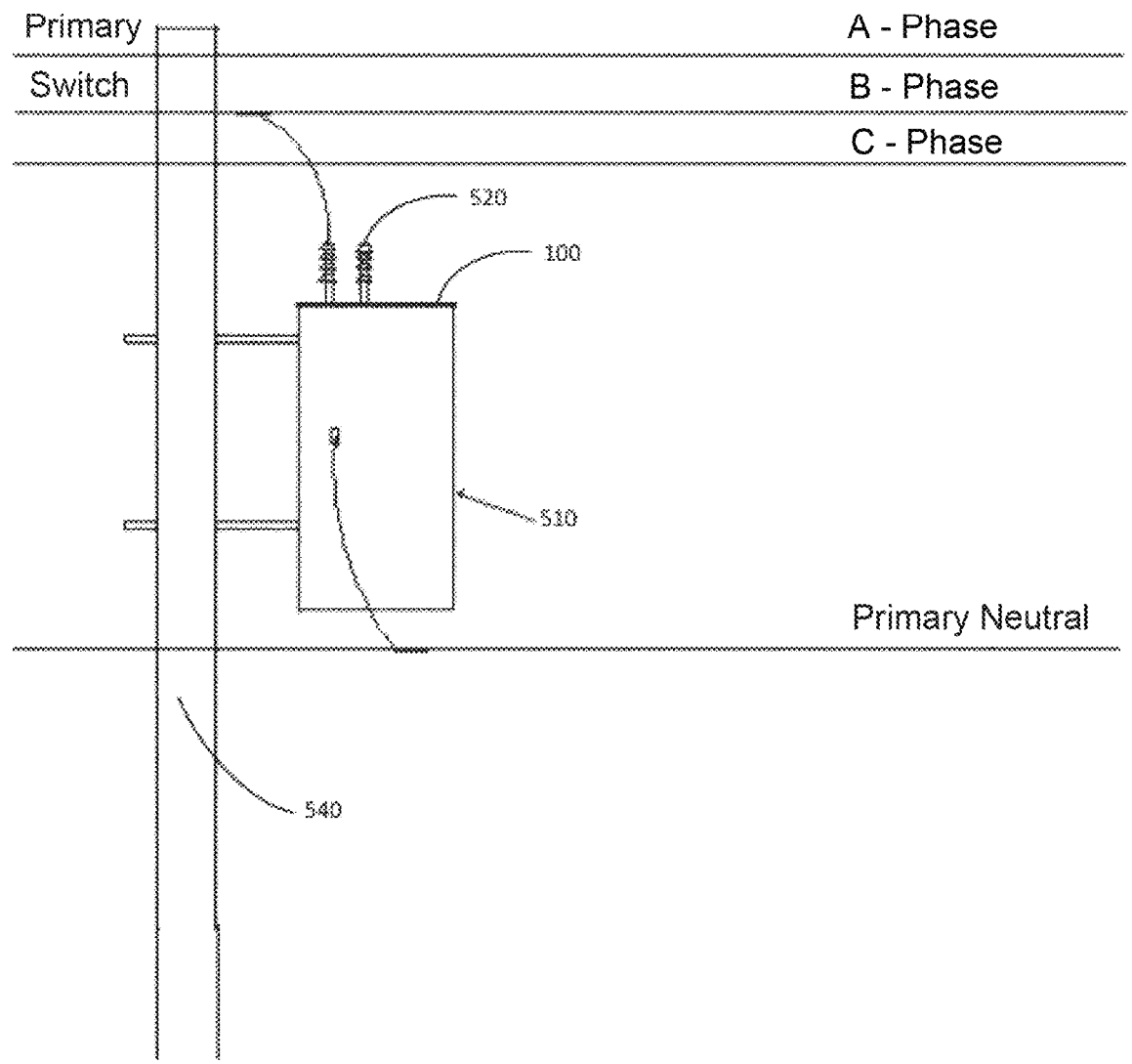
FIG. 1 represents a side view of an overhead electrical power line system equipped with the apparatus according to one embodiment of the present invention. In this view an insulator can be seen covering the top surface of the transformer and two bushings can be seen extending upward through the insulator.

FIG. 1 provides a standard three phase overhead powerline system equipped with an outage prevention insulator 100 under one embodiment of the present invention. In this figure, a transformer 510 can be seen supported on an electrical pole with two bushings 520 extending upward from the top of the transformer. One bushing and the transformer are shown connected to the B phase and primary neutral lines of the power system, respectively, such that the system is energized, and the transformer serves as a potential ground for the energized system. As can be seen, the insulator 100 covers the entire top surface of the transformer 510, which creates an effective barrier to prevent a short circuit event from occurring should an animal or debris become energized such as via contact with a cable or other energized electrical conductor that forms a part of the power transmission system.

Figure 2A:
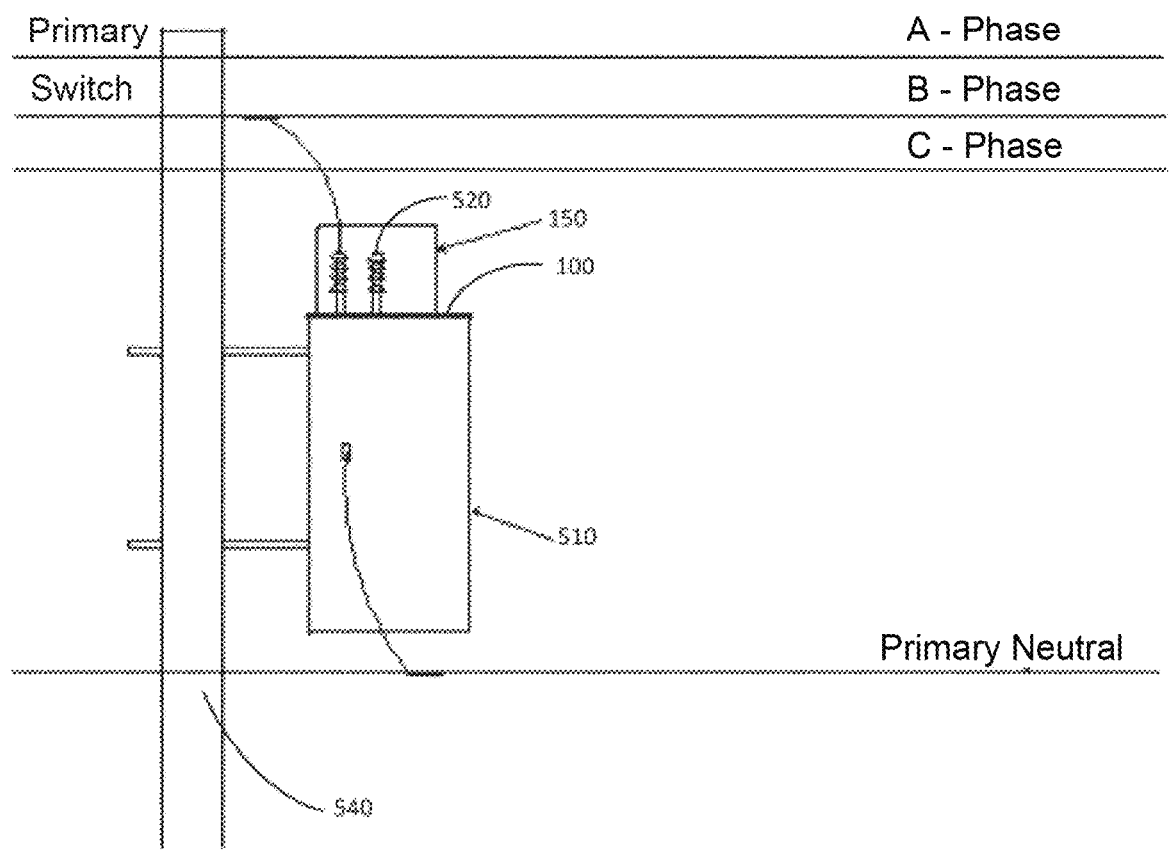
FIG. 2A represents a side view of an overhead electrical line system equipped with the apparatus according to one embodiment of the present invention. In this view an insulator can be seen on covering the top surface of the transformer, and the apparatus is further equipped with an enclosure that surrounds the bushings.

FIG. 2A shows a standard three-phase overhead powerline system equipped with an outage prevention insulator 100 under another embodiment of the present invention. In this figure, a transformer 510 can be seen supported on an electrical pole with two bushings 520 extending upward from the top of the transformer. One bushing and the transformer are shown connected to the B phase and primary neutral lines of the power system, respectively, such that the system is energized, and the transformer serves as a potential ground for the energized system. As can be seen, the insulator 100 covers the entire top surface of the transformer 510, which creates an effective barrier to prevent a short circuit event from occurring should an animal or debris become energized such as via contact with a cable or other energized electrical conductor that forms a part of the power transmission system. The FIG. 2A embodiment further comprises an enclosure 150 that surrounds the bushings 520 to further deter animal or debris contact therewith. In this embodiment, the enclosure 150 comprises a top surface a side wall that extends downward therefrom to connect with the insulator 100 such there are no significant gaps or openings, which further protects the electrical deliver system from a short circuit event.

Figure 2B:
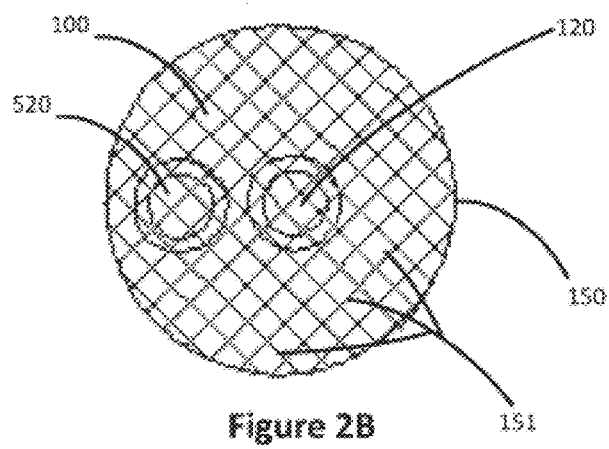
FIG. 2B provides a top view of an exemplary embodiment of the present invention. In this embodiment, the enclosure comprises a grate that forms a cage over the top surface of the bushing to deter animal contact therewith. Two bushings can be seen underneath the grate.

FIG. 2B shows a top view of an embodiment of the present invention as installed on a transformer. Note that, in this figure, the transformer's view is obstructed by the insulator 100, which is shown resting upon the top surface of the transformer. Here, the entire top surface of the insulator 100 is visible beneath a grate, cage, or guard 151 that forms a top surface of the enclosure 150. Two bushings 520 are also visible underneath the grate, cage, or guard 151. In this embodiment, the grate, cage, or guard 151 comprises a lattice-like structure to permit electrical cables to contact the bushings 520.

The enclosure 150 of the FIG. 2 embodiment can be reversibly attached to the insulator 100 or can be provided integral therewith. In embodiments, the enclosure 150 can be snapped or screwed into place around the bushings and joined with the insulator 100.

Figure 3A:
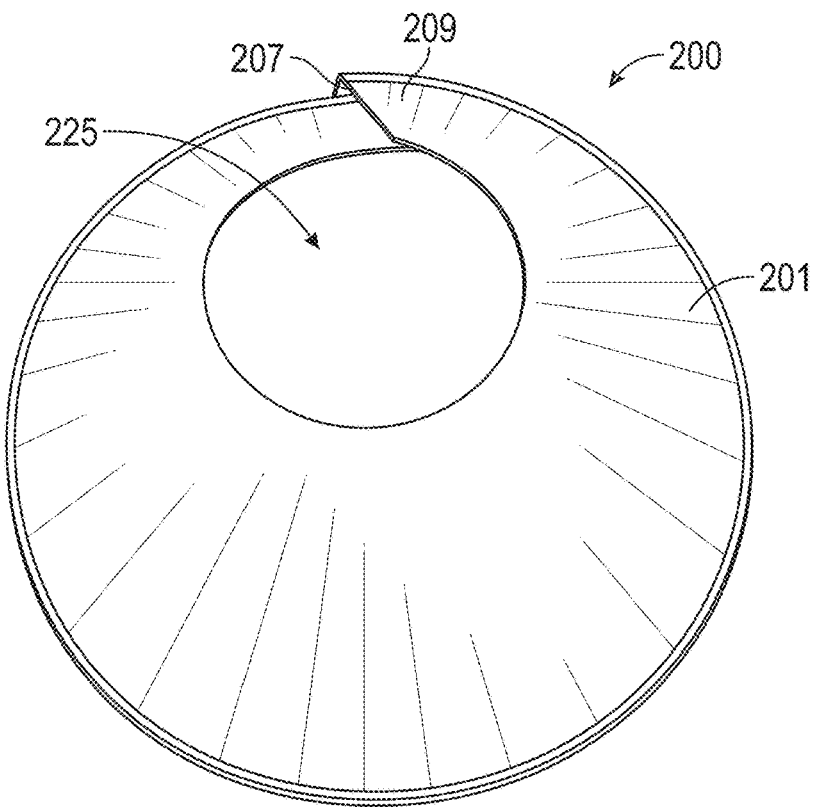
FIG. 3A provides a top view of one embodiment of the present apparatus.

FIG. 3A provides a top view showing the top surface 201 of an insulator 200 under one embodiment of the present invention. The pictured insulator 200 comprises a bushing port 225 in the form of hole, gap, notch, channel, or combination thereof extending therethrough. The insulator in the FIG. 3 embodiment further comprises a connector assembly 207 that permits the insulator to be easily installed and secured over the top surface of the transformer. In this embodiment, the connector assembly 207 includes overlapping flaps-a top flap 209 and a bottom flap (seen at 211 of FIG. 3B) which serve to assist in the formation of a continuous barrier to protect the top surface of a transformer from coming into contact with an energized animal or energized debris.

Figure 3B:
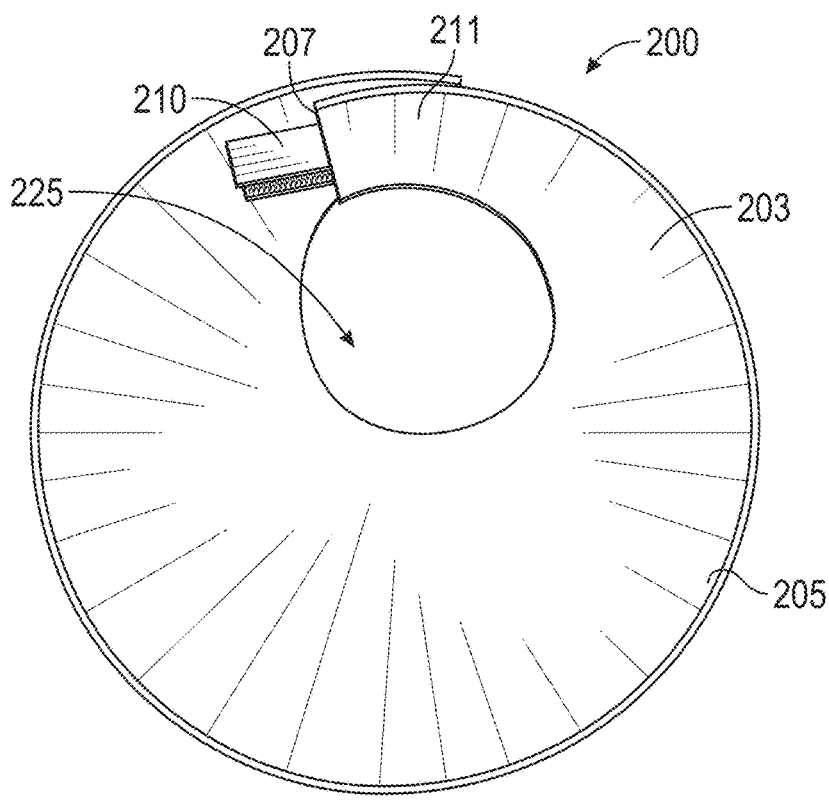
FIG. 3B provides a bottom view of the FIG. 3A embodiment.

FIG. 3B provides a bottom view to reveal a bottom surface 203 of the insulator 200. In this embodiment, the insulator 200 comprises a side wall 205 that extends downward from the top surface of the insulator 200. In operation, the side wall 205 can serve to protect at least a portion of the transformer side from coming into contact with an energized animal (such as via a dangling tail or feet that may otherwise interact with the side of the transformer). In embodiments, the side wall 205 can extend bout $1/10$ of the length of the transformer side. The side wall 205 can extend up to the entire side the transformer. In certain embodiments, the side wall 205 extends about halfway down the side of the transformer. The side wall 205 can be configured to extend about $1/16$, about $1/8$, about $3/16$, about $1/4$, about $5/16$, about $3/8$, about $7/16$, about $1/2$, about $9/16$, about $5/8$, about $11/16$, about $3/4$, about $13/16$, or about $7/8$ of the way down the side of the transformer.

As visible in FIG. 3B, The connector assembly 207 can further comprise a means 210 for reversibly securing the insulator 200 to the transformer. As shown, the means for reversibly securing the insulator to the transformer can comprise a hook and loop strap 210. In alternate embodiments, the means 210 for reversibly securing the insulator 200 to the transformer comprises a latch, a buckle, a clamp, a clasp, a side release buckle, a carabiner, a snap-fit, a friction fit, a hook, a button and eye, a cam lock, a post and keyhole, a press-fitting, a thread locking, a snap, a spring-loaded pins, any other attachment means known in the art, or a combination thereof.

In the present embodiment, the means 210 for reversibly securing the insulator is shown at the end of the bottom flap 211 of the connector assembly 207. However, the means 210 for reversibly securing the insulator to the transformer can be located anywhere on the insulator 200. In embodiments, the means for attaching the insulator 200 to the transformer can be placed on the insulator, the transformer, or both. By way of example, the transformer can be equipped with a male snap and the insulator can be equipped with a female snap, or vice versa, such that the snaps can be aligned to permit effective tethering of the insulator to the transformer. Alternate attachment means, such as those disclosed herein, can be applied in like manner.

In various embodiments, the connector assembly 207 permits rapid coupling of the insulator to the transformer. The connector assembly 207 can be configured such that the insulator 200 can be installed while on an energized system. For instance, the insulator 200 can be safely installed by a lineman without requiring a temporary shutdown of the electrical system or other outage. Embodiments are configured to permit installation of the insulator 200 in less than 5 minutes. In embodiments, the insulator 200 can be installed in one minute or less. In embodiments, the connector assembly 207 permits the insulator 200 to be installed without the need for tools.

Figure 3C:
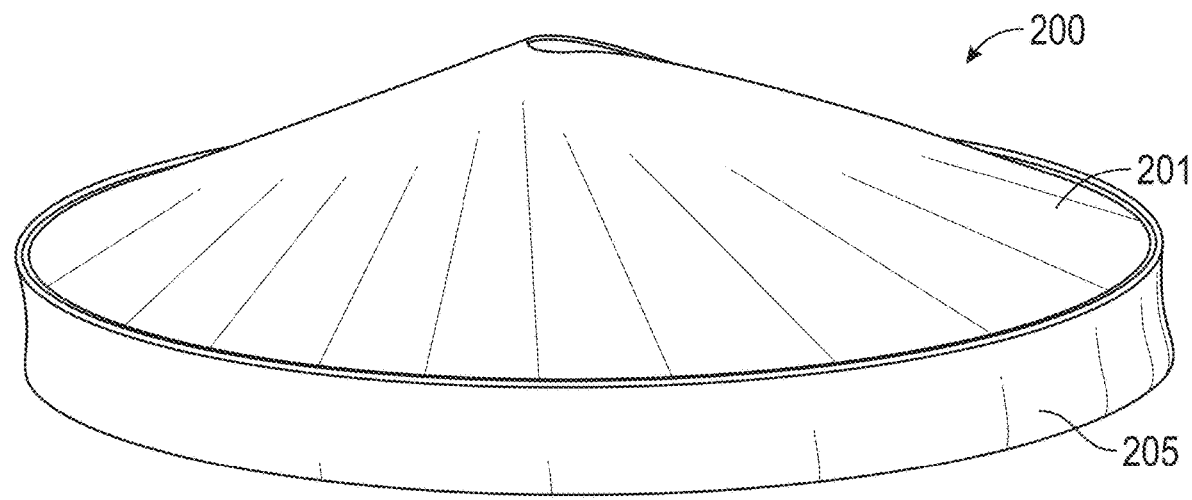
FIG. 3C provides a side perspective view of the FIG. 3A embodiment.
Figure 3D:
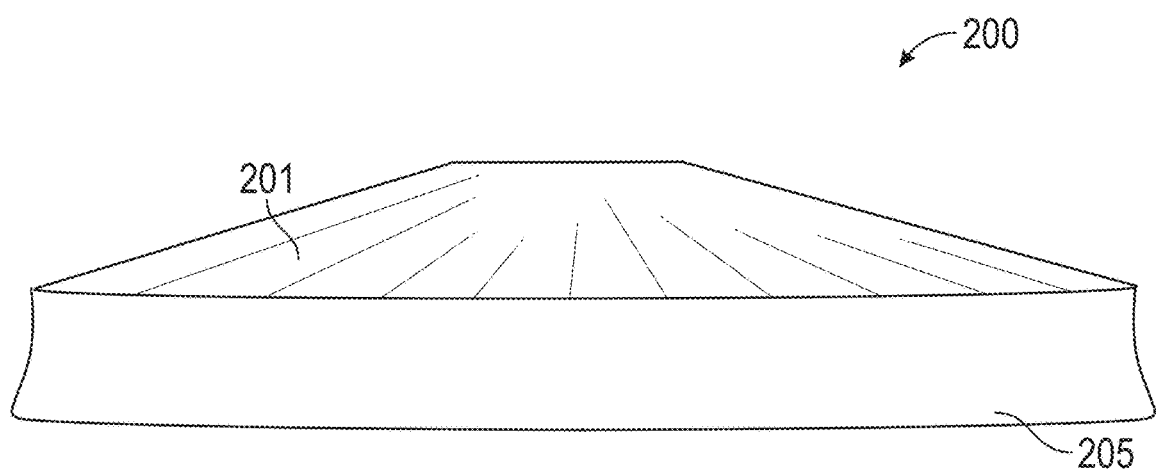
FIG. 3D provides a side view of the FIG. 3A embodiment.

FIG. 3C provides a side perspective view of the insulator 200 shown in the FIG. 3A embodiment and FIG. 3D provides a side view of the same. These figures reveal the side wall 205 of the insulator 200. As can further be seen, top surface 201 of the insulator 200 can comprise an angled or shaped configuration. Alternate configurations are further included in the present disclosure. By way of example, the insulator can be configured such that the insulator 200 can be adapted for use with any of the various commercially available transformers on the market today or later developed to permit a tight-fitting and continuous seal over the top of the transformer. The insulator 200 can be further configured to permit a tight-fitting and continuous seal around the side of the transformer.

Although the shape of the FIG. 3 insulator 200 is generally conical or circular, in alternative embodiments, the insulator 200 comprises any shape. In embodiments, the shape may be elliptical, circular, or polygonal. In certain embodiments, the shape of the insulator 200 comprises a rhombus, parallelogram, or trapezoid. The shape of the insulator 200 can comprise a triangle, square, rectangle, pentagon, hexagon, heptagon, octagon, nonagon, decagon, circle, oval, half circle, quarter circle. The insulator of certain embodiments comprises a shape that includes one or more arcs, parabolas, or hyperbolas.

In another example embodiment depicted in FIGS. 4A-4E, insulator 300 includes two pieces, left part 320 and right part 340, that assemble over the top of the transformer 510 to protect the transformer 510. Similar to insulator 100, insulator 300 has a bushing port 325, sidewall 305, top surface 301 and bottom surface 303.

An optional rotatable pin hinge left and right parts 318, 319 joins the insulator 300 from one end from which it can pivot open or closed. On the other end, it has an optional clasp 313 (male side 314 and female side 316). Each side has an optional flange 310 with optional slots 312 that can be used to help secure the left part and the right part together, or to adhere other objects by a lineman. Through these slots 312, a zip tie or other connector or fastener can be used. While slots 312 are shown with a rectangular shape, slots 312 can take on a circular, square, hexagonal, or octagonal form or any other shape. Additionally or alternatively, insulator 300 could optionally be secured by means 210.

Additionally or alternatively to the flange 310 with slots 312, a clip 360 can be used as shown in another example embodiment of insulator 350 in FIGS. 6A and 6B.

This embodiment has optional transformer spacers 344 that can sit directly on the top surface of the transformer. The spacers help create an insulative air gap between the top of the transformer and the bottom of the insulator. This allows for a thinner material of the insulator. Additionally, the spacers can lay flat on the surface help the insulator remain in place if it comes into contact with an animal or inclement weather. Additionally, the spacers can also be used to structurally reinforce the insulator.

This embodiment also has an optional undercut lip 342 extending from the side wall 305, that can help prevent objects from entering up through a potential gap between the insulator 300 and the transformer 510 by minimizing the gap. "Undercut" as used herein is intended to refer to the shape (e.g., a rock eroded away on the bottom by a river) and does not refer to any manufacturing process step. Additionally, the sidewall and the undercut lip of the insulator can help to secure the insulator to accommodate an upper lip 515 of the transformer.

The example bushing port 325 of insulator 300 and 350 is sized with a clearance for the inner diameter of the ceramic insulator of the bushing whereas the example bushing port 425 is sized with a clearance for the outer diameter of the ceramic insulator of the bushing. The smaller size is better at keeping debris out while the larger size allows for more flexibility of position of the insulator relative to the bushing. Either of these or other sizes can be used. Optionally, an insulative sealant can be used to prevent debris from entering the transformer area through the bushing port.

Another example embodiment is insulator 350 of FIGS. 6A and 6B, which is similar to insulator 300, except that in place of the flanges 310 on the top surface 301 of the insulator 300, it has an optional clip(s) 360 that can be used to secure the left part to the right part. FIG. 6A shows left part and right part of insulator 350 in an assembled state, held together by clip 360 and clasp 313. Clip 360 can use surface friction, an indention to catch the clip, a detent or other methods of reversibly securing the left part to the right part. Or this could be replaced with the connector assembly 207 of insulator 200.

FIGS. 7A-7C depict another example insulator 400 whose top surface 401 and bottom surface 403 are flat. As depicted in FIGS. 7A-7C, flange 310 on the example insulator 400 can optionally extend from the undercut lip 342 over the top surface 401 (or bottom surface 403 across the length of the insulator 400 until again reaching the undercut lip 320. Insulator 400 has differently shaped transformer top surface spacers 344

FIG. 8 depicts an example embodiment showing different pre-determined bushing locations 450. In this way, the lineman can remove material in pre-determined locations and adapt the insulator to different brands and models of transformers.

Additionally, the insulators can have holes or other attachment mechanisms such as those of connection means 210 in which to be hooked on to a lineman's belt, carabiner, or a boom/lift bucket for easy transfer and accessibility and to prevent unintentional loss of insulators from the lineman. Alternatively, the flange slots can be used for this purpose.

In embodiments, the insulator can be configured to fit over the top surface of any commercially available or custom-designed transformer. In embodiments, the insulator is configured to completely cover the top surface of a transformer comprising a kilovolt (KV) rating of about I KV or more. In embodiments, the insulator is configured to cover the entire top surface of a transformer comprising a rating of less than I KV. The insulator can comprise a surface area that is sufficient to cover the top surface of a transformer comprising a KV rating of up to about 1,000 KV. In certain embodiments, the insulator is configured to cover the top surface of a transformer with a KV rating of greater than 1,000 KV. Without being bound by theory, the insulator can be configured to cover the top surface of a transformer with a 5,000 KV rating.

The insulator includes a diameter or length of between about 1 inch and about 1,000 inches, inclusive. In certain embodiments, the insulator comprises a diameter or length of up to about 50 inches. The diameter or length of the insulator can be about 5 inches, about 10 inches, about 15 inches, about 20 inches, about 25 inches, about 30 inches, or about 35 inches.

The insulator can comprise any thickness that is sufficient to reduce or block the flow of electrons thereacross. In embodiments, the insulator is between about $\frac{1}{32}$ of an inch thick and $\frac{1}{2}$ of an inch thick, inclusive. The insulator can be less than $\frac{1}{32}$ of an inch thick. In embodiments, the insulator is more than 1 inch thick.

The bushing port can be configured to allow for extension of a bushing through the insulator. Insulators can comprise one or more bushing ports. In various embodiments, the insulator comprises between one and twenty bushing ports. In embodiments, insulators comprise up ten bushing ports. Insulator can comprise one, two, three, four, five, six, seven, eight, nine, or ten bushing ports.

In embodiments, any one or more of the number, configuration, size, and shape of the bushing ports can be customizable. In embodiments, the insulator is configured to permit customization of the bushing port number, configuration, size, or shape by the lineman at the site of installation. The insulator can comprise a means for selective a customizable size or shape of a bushing port. In embodiments, such means can comprise a removable portion of the insulator, wherein the size and shape of the removable portion can vary depending on the size and shape of the bushing or transformer. In certain embodiments, the insulator comprises a perforation extending at least partially therethrough, which outlines various sizes and shapes and locations of various bushing ports such that a lineman can "punch out" or otherwise remove material to form a bushing port of a specific size or location immediately prior to installation of the same. Such a configuration permits the lineman to accurately install the insulator over a number of transformers and bushing configurations without the need to pre-configure the same. Under certain embodiments, the removable portion may comprise a threadable attachment that can be screwed off or on depending on the needs of the lineman, the transformer configuration, the bushing configuration, or a combination thereof. In other embodiments, a configuration can be printed or embossed on the surface, providing a template for the lineman to cut out a bushing port in the exact location. The template can have pre-specified configurations corresponding to the location and size of the bushings of different brands and models, and the lineman can check the brand the model and customize on the spot the insulator for a specific transformer.

In embodiments, the insulator is comprised of a non-conductive material. The insulator can comprise material that is highly durable and resistant to degradation over time. In embodiments, the insulator is effective at reducing or eliminating outages for up to 5 years. Without being bound by theory, the insulator can be effective at reducing or elimination outages for up to about 10 years, up to about 20 years, up to about 30 years, up to about 40 years, or up to about 50 years. The material can be configured to withstand exposure to the elements including hurricanes, tornadoes, hail, or other adverse weather for any of the various time points mentioned herein. In various embodiments, the insulator is water resistant such that water is prevented from passing through the insulator. The insulator can be substantially waterproof to prevent water intrusion from becoming a source of powerline failure. Additionally or alternatively, the bottom of the insulator is open to allow runoff of rain water and snow melt. The insulator can be configured to be heat-resistant and can further be configured of materials that are substantially fireproof.

In certain embodiments, the insulator is lightweight and can be transported up a powerline pole. The insulator can be handled by a single lineman to permit simple installation, such as from a bucket truck. The insulator can weigh less than 30 pounds. In embodiments, the insulator weighs less than 20 pounds. The insulator can weigh less than 10 pounds. In embodiments, the insulator weighs about 10 lbs., about 9 lbs., about 8 lbs., about 7 lbs., about 6 lbs., about 5 lbs., about 4 lbs., about 3 lbs., about 2 lbs., or about 1 lb. In certain embodiments, the insulator weighs less than about 1 pound. The insulator can weigh about 0.1 lb., about 0.2 lbs., about 0.3 lbs., about 0.4 lbs., about 0.5 lbs., about 0.6 lbs., about 0.7 lbs., about 0.8 lbs., or about 0.9 lbs.

The insulator can be configured to be installed aftermarket or the insulator can be configured to be installed on transformers during manufacturing of the transformer. In embodiments, the insulator is configured to be placed on a transformer prior to final installation of the transformer. The insulator can be configured to be placed around a transformer that is already in active use.

Optionally, the insulator is factory-applied.

The insulator can comprise a coating. In one embodiment, the insulator coating is applied to at least one surface of a transformer. In one embodiment, the insulator coating is applied to a top surface of the transformer. The insulator coating can be applied to at least one sidewall of the transformer. In embodiments, the insulator coating is applied to at least the top ⅛ of at least one sidewall of the transformer. The insulator coating can be applied to cover the top 1/16, ⅛, ⅙, ⅕, ¾, ⅓, ½, ⅔, ¾, ⅝, or ⅞ of the sidewall. In one embodiment the insulator coating completely covers the at least one sidewall. The insulator coating can be configured to completely cover the top surface of a transformer, one or more sidewalls of the transformer, the bottom surface of the transformer, or a combination thereof. In embodiments, the insulator coating is applied over the entire top surface of the transformer, the entire one or more sidewall surfaces of the transformer, the entire bottom surface of the transformer, or a combination thereof to achieve complete coverage and uniform consistency and thickness across the surface to which the insulator coating is applied. In one embodiment, the insulator coating covers the entire transformer. Examples of insulator coatings with low dielectric constants are parylene N, parylene C, acrylic, epoxy, silicone and urethane. One or more primers may be used to facilitate adhesion.

In some embodiments, the insulator coating is pumped to a coating apparatus (such as, but not limited to, one or more sprayers, a reverse roll coater, or a curtain coater). The insulator coating can be applied to the at least one surface of a transformer as the transformer passes under or through the coating apparatus. In one embodiment, the transfer is passed under a roll coater, then the insulator coating is gravity fed and laid over the transformer. A second coat of insulator coating can optionally be applied over the first coat of insulator coating or veil by a coating apparatus in the same or similar manner as described above (i.e., sprayers, reverse roll coater, curtain coater). In embodiments, the second insulator coating is the final insulator coating. Certain embodiments comprise up to 20 coats of insulator coating. Embodiments can comprise up to 10 coats of insulator coating. Embodiments comprise 1, 2, 3, 4, 5, 6, 7, 8, 9, or 10 coats of insulator coating.

In certain embodiments, the insulator includes a fluid-applied spray that is applied directly to at least one surface of the transformer. The spray should be suitable for heavy-industrial use and maintain its form. It can be a combination of foaming agents and other liquids.

In various embodiments, the insulator can be provided in a variety of colors or can be color-coded to indicate a given designation for a power company. In one embodiment, the insulator is colored red as the universal sign of danger. Such coloration will deter individuals from approaching or contacting the energized areas surrounding the insulator, and may be particularly useful in the event of downed power lines or other damage that may make the transformers more accessible to the general public. Certain embodiments can employ glow-in-the dark mechanisms to permit the insulator and transformers to be more easily identified by lineman or by the general public.

Embodiments can be created through the process of sculpting, injection molding, casting, or other known methods. Certain embodiments may be printed using three-dimensional printing technology.

Alternate aspects are directed to methods of installing and using any of the various apparatus embodiments disclosed herein, which will be apparent to one having skill in the art.

INDUSTRIAL APPLICABILITY

In addition to the goals stated above, the devices and methods herein can be used to make safer the jobs working on the power grid, improve reliability/up-time of the power grid, and decrease pole-mounted transformer-related animal incidents.

100 insulator
120 conductor (electrical cables?)
150 enclosure
151 grate, cage, or guard
200 insulator
201 top surface of insulator
203 bottom surface of insulator
205 side wall
207 connector assembly
209 top flap
210 means for reversibly securing the insulator to the transformer
211 bottom flap
225 bushing port
300 insulator
301 top surface of insulator
303 bottom surface of insulator
305 side wall 310 flange for reversibly securing the insulator to the transformer
312 flange slots
313 clasp (assembled)
314 clasp (male side)
316 clasp (female side)
318 pin hinge (left)
319 pin hinge (right)
320 left part
325 bushing port
340 right part
342 undercut lip
344 transformer spacers
350 insulator
360 top surface clasp
400 insulator
401 top surface of insulator
403 bottom surface of insulator
405 side wall
420 left part
425 bushing port
440 right part
510 transformer
515 transformer upper lip
520 bushings
540 utility pole

The invention claimed is:

1. An apparatus for preventing power outages comprising:
an insulator, wherein the insulator comprises a non-conductive material, a bushing port, and a means for reversibly securing the insulator to a transformer, and the insulator is configured to completely cover a top surface of the transformer;
wherein the insulator is configured to prevent an electrically charged animal or debris from contacting a grounded surface of the transformer, and
the insulator is configured to be able to be installed safely on an energized transformer without deenergizing the transformer.

2. The apparatus of claim 1, wherein the means for reversibly securing the insulator to the transformer comprises a latch, a buckle, a clamp, a clasp, a side release buckle, a carabiner, a snap-fit, a friction fit, a hook and loop connector, a button and eye, a cam lock, a post and keyhole, a press-fitting, a thread locking, a snap, a spring-loaded pins, or a combination thereof.

3. The apparatus of claim 2, wherein the means for reversibly securing the insulator to the transformer secures the insulator to itself.

4. The apparatus of claim 1, wherein the insulator comprises a sidewall configured to extend down a portion of at least one side of the transformer.

5. The apparatus of claim 1, wherein the insulator has an open configuration in which it is removable from the transformer and a closed configuration in which it secures onto a bushing extending through the bushing port.

6. The apparatus of claim 5, wherein the insulator is configured to be attached to the bushing port of the transformer and is not required to be separately fastened to a non-bushing-port part of the transformer.

7. The apparatus of claim 6, wherein the insulator is configured to rest gravitationally upon the top surface of the transformer.

8. The apparatus of claim 5, wherein the non-conductive material is sloped or convex over the top of the transformer.

9. The apparatus of claim 5, wherein the bushing port is at a highest point of the insulator.

10. The apparatus of claim 9, wherein the non-conductive material is conical.

11. The apparatus of claim 5, wherein an opening of the bushing port is designed to fit snugly around an outer diameter or an inner diameter of the bushing.

12. The apparatus of claim 5, wherein the insulator is marked for material removal corresponding to additional bushings.

13. The apparatus of claim 5, wherein the insulator has two flaps that secure together around the bushing port.

14. The apparatus of claim 5, wherein the insulator has two sides that secure together around the bushing port.

15. The apparatus of claim 5, further comprising spacers extending from a lower or inside surface of the insulator that define an insulative air gap between the lower surface of the insulator and the top surface of the transformer.

16. The apparatus of claim 15, wherein the spacers are designed to be over the top surface of the transformer and at least partially interior to a sidewall of the transformer.

17. The apparatus of claim 5, wherein the transformer is pole mounted and is operable to step down voltage from a standard three-phase overhead powerline system to a residential voltage.

18. The apparatus of claim 5, wherein the insulator is at least ⅛ inches thick.

19. The apparatus of claim 1, wherein the bushing port comprises a hole, gap, notch, channel, or combination thereof extending therethrough, wherein the bushing port comprises a configuration that is complimentary to that of at least one bushing, and is configured to permit the least one bushing to extend through the insulator.

20. The apparatus of claim 1, wherein the insulator comprises a surface area that is sufficient to cover the top surface of a transformer comprising a kilovolt (KV) rating of about 1 KV or more.

21. A method of retrofitting an installed transformer with a metal casing, the method comprising the steps:
installing an insulator with a bushing port on an energized transformer without deenergizing the transformer including,
placing the insulator over a top of the installed transformer casing with the bushing port around the bushing of the transformer until
the insulator covers completely the top of the installed transformer,
the bushing port is at a highest point of the insulator and allows access to the bushing of
the transformer; and
securing the insulator to itself using a fastener.

22. The method of claim 21, further comprising steps of removing the insulator from the installed transformer,
connecting an electrical line to the installed transformer, and
reinstalling the insulator on top of the installed transformer with the bushing port allowing a connection from the electrical line to the bushing.

23. The method of claim 21, further comprising the step of punching out an additional bushing port in the insulator, wherein the step of placing and securing includes the additional bushing port allowing access to an additional bushing of the installed transformer.

24. The method of claim 21, wherein the step of placing and securing includes placing a left part and a right part of the insulator around different sides of the bushing before securing the insulator around the installed transformer.

25. The method of claim 21, further comprising positioning a sidewall of the insulator around a sidewall of the installed transformer so that the sidewall extends down from the top of the transformer.

26. The method of claim 21, wherein the step of placing and securing includes positioning spacers above the top surface of the transformer and at least partially interior to a sidewall of the transformer.

27. An apparatus for preventing power outages, the apparatus comprising:
  an insulator configured to completely cover a top surface of a transformer, the insulator comprising a non-conductive material shaped with a sidewall extending downwards; and
  a bushing port at a highest point in the insulator corresponding to a location of a bushing of the transformer;
  wherein the insulator has an open configuration in which the insulator is removable from the transformer and a closed configuration in which the insulator secures onto the bushing extending through the bushing port, and
  the insulator can transition between the open configuration and the closed configuration to be safely installed on the transformer when the transformer is energized.

28. The apparatus of claim 27, wherein the insulator in the closed configuration secures to itself using a latch, a buckle, a clamp, a clasp, a side release buckle, a carabiner, a snap-fit, a friction fit, a hook and loop connector, a button and eye, a cam lock, a post and keyhole, a press-fitting, a thread locking, a snap, a spring-loaded pins, or a combination thereof.

29. The apparatus of claim 27, wherein the insulator is conical.

30. The apparatus of claim 27, comprising spacers extending from a lower or inside surface of the insulator that define an insulative air gap between the lower surface of the insulator and the top surface of the transformer,
  wherein the spacers are designed to be over the top surface of the transformer and at least partially interior to a sidewall of the transformer.

31. An apparatus for preventing power outages comprising:
  an insulator, wherein the insulator comprises a non-conductive material, a bushing port, and a means for reversibly securing the insulator to a transformer, and the insulator is configured to completely cover a top surface of the transformer; and
  spacers extending from a lower or inside surface of the insulator that define an insulative air gap between the lower surface of the insulator and the top surface of the transformer,
  wherein the insulator is configured to prevent an electrically charged animal or debris from contacting a grounded surface of the transformer,
  the insulator has an open configuration in which it is removeable from the transformer and a closed configuration in which it secures onto a bushing extending through the bushing port, and
  the spacers are designed to be over the top surface of the transformer and at least partially interior to a sidewall of the transformer.

* * * * *